US012064934B2

(12) United States Patent
Mies et al.

(10) Patent No.: US 12,064,934 B2
(45) Date of Patent: Aug. 20, 2024

(54) ADJUSTABLE INITIAL PRESSURE RAIL FOR ROTARY PRESS HAVING INTEGRATED MEASUREMENT OF THE INITIAL PRESSURE FORCE

(71) Applicant: Korsch AG, Berlin (DE)

(72) Inventors: Stephan Mies, Berlin (DE); Ingo Klaer, Berlin (DE); Michael Matthes, Dallgow-Döberitz (DE)

(73) Assignee: Korsch AG, Berlin (DE)

( * ) Notice: Subject to any disclaimer, the term of this patent is extended or adjusted under 35 U.S.C. 154(b) by 997 days.

(21) Appl. No.: 16/964,568

(22) PCT Filed: Dec. 19, 2018

(86) PCT No.: PCT/EP2018/085762
§ 371 (c)(1),
(2) Date: Jul. 23, 2020

(87) PCT Pub. No.: WO2019/145097
PCT Pub. Date: Aug. 1, 2019

(65) Prior Publication Data

US 2021/0031477 A1 Feb. 4, 2021

(30) Foreign Application Priority Data

Jan. 25, 2018 (EP) .................................... 18153467

(51) Int. Cl.
*B30B 11/00* (2006.01)
*B30B 11/08* (2006.01)

(52) U.S. Cl.
CPC .......... *B30B 11/005* (2013.01); *B30B 11/085* (2013.01)

(58) Field of Classification Search
CPC ..... B30B 11/005; B30B 11/085; B30B 11/08; B30B 11/34; B30B 15/02
See application file for complete search history.

(56) References Cited

U.S. PATENT DOCUMENTS 3,063,390 A * 11/1962 Frank .................... B30B 11/005 425/134
5,211,964 A * 5/1993 Prytherch ............... B30B 11/08 425/149
6,186,762 B1 2/2001 Matthes

FOREIGN PATENT DOCUMENTS

CN 2721383 Y 8/2005
CN 103707547 B 8/2016
(Continued)

OTHER PUBLICATIONS

International Search Report and Written Opinion for International Application No. PCT/EP2018/085762, mailed Mar. 21, 2019.
(Continued)

*Primary Examiner* — S. Behrooz Ghorishi
(74) *Attorney, Agent, or Firm* — Wolf, Greenfield & Sacks, P.C.

(57) ABSTRACT

A rotary press comprising at least one pressing station having each of a vertically-adjustable upper and lower pressure roller, which are mounted by axes in the at least one pressing station. Cam-guided upper punches having punch heads are fed to the upper pressure roller by a control cam and a pull-up cam raises the upper punches to a highest point above a filling device. A vertically-adjustable safety cam is designed to be vertically adjustable in relation to the upper pressure roller. The rotary press may comprise a preliminary pressure cam, which is integrated in a guide block.

17 Claims, 3 Drawing Sheets

(56) References Cited

FOREIGN PATENT DOCUMENTS

| | | | |
|---|---|---|---|
| DE | 197 05 092 | C1 | 3/1998 |
| JP | 2000-301395 | A | 10/2000 |
| SU | 656872 | A1 | 4/1979 |
| SU | 1013305 | A1 | 4/1983 |
| WO | WO 00/32386 | A1 | 6/2000 |

OTHER PUBLICATIONS

International Preliminary Report on Patentability for International Application No. PCT/EP2018/085762, mailed Dec. 19, 2019.

* cited by examiner

ADJUSTABLE INITIAL PRESSURE RAIL FOR ROTARY PRESS HAVING INTEGRATED MEASUREMENT OF THE INITIAL PRESSURE FORCE

This application is a national stage filing under 35 U.S.C. 371 of International Patent Application No. PCT/EP2018/085762, filed Dec. 19, 2018, which claims priority to German application no. 18153467.8, filed Jan. 25, 2018, each of which is herein incorporated by reference in its entirety.

The invention relates to a rotary press for the production of single-layered or multi-layered tablets comprising at least one filling device for filling a pressing material into openings of a die plate, at least one filling station, at least one metering station for the lower punches, at least one pressure station, and at least one ejection station having tablet stripper and tablet discharge chute, wherein the at least one pressure station comprises respectively an upper and a lower pressing roller and respectively an upper and a lower cam track, wherein the cam tracks interact with upper and lower punches. In a further aspect, the invention relates to the use of the rotary press.

PRIOR ART

It is known that rotary presses are used for the production of pharmaceutical tablets or chemical, technical, or industrial pellets in large piece counts from powdered raw materials in particular. Rotary presses generally have a rotor having circular foot-print, which comprises an upper and a lower punch guide, and also a die plate arranged in between. This die plate has openings or die holes, into which the material to be compressed is filled in a filling station by means of a filling device. The material filled into the die holes is metered by means of a metering station. Metering in terms of this invention means that excess pressing material is pushed back into the filling device by the raising of the lower punch.

The upper and lower punches are moved axially on the rotor circumference by means of stationary control cams that are located above and below the rotor and are fastened on the respective stationary cam carriers. In rotary presses, head-guided or roll-guided punch shafts are used. The upper punch guide of the rotor is formed by axial holes in the upper part of the rotor for the upper punch shafts. The lower punch guide is similarly formed by axial holes in the lower part of the rotor for the lower punch shafts. These axial holes are arranged aligned with the die holes of the die plate, so that the upper punches and the lower punches can move within the die hole during the filling and pressing procedure.

The pressing of the pellets takes place in a pressing station of the rotary press. During the rotation of the rotor of the rotary press, an upper and lower punch pair are each successively drawn through two pressure rollers, which are provided arranged one over another in a pressure roller station. Such a pressure roller station is described, for example, in DE 197 05 092 C1. A pressing station is anchored fixedly on the carrier plate of a rotary press and comprises an upper and a lower pressure roller, wherein the pressure rollers are fastened by means of bearing blocks on the guide column of the pressing station and are provided arranged adjustably in relation to one another. Due to the positioning of the pressure rollers in relation to one another, the upper and lower punches are moved toward one another, whereby a pressing force is exerted on the pressing material between the punches within the die. Due to the action of the pressing force on the pressing material, a pellet is produced from the powdered pressing material.

The formation of a pellet is based on a compaction procedure, in which the pressing tools move toward one another within the die hole, wherein air possibly present, which is located between the powder particles, is pressed out of the pressing material located between the pressing surfaces of the punches. The compaction results in an essentially complete removal of air-filled intermediate spaces between the powder particles. Due to the absence of these intermediate spaces, the pressing particles obtain contact with one another, whereby interlocking and connecting of the particles with one another is achieved due onto the transmission of the pressing force to the pressing particles. A pellet is obtained which has a defined hardness. If only one pressing station is present in a rotary press, it is referred to as the main pressing station. The corresponding compaction procedure is referred to as the main compaction.

A disadvantage of these rotary presses described in the prior art having only one pressing station is that if only one main pressing station is present, often poor deaeration of the pressing material is achieved. This effect applies both to powdered pressing material for pharmaceutical pellets, and also particularly voluminous pressing materials or those pressing materials which have a high powder ultrafine component. Insufficient deaeration results in an incomplete compaction procedure and in pellets having uneven or inadequate hardness. In addition, such pellets tend toward cracking and capping.

The inadequate deaeration can be countered by equipping the rotary press with a second pressing station. This second pressing station is referred to as a initial pressure station and is primarily used to remove the air enclosed in the pressing material from the pressing material before the main compaction. Is thus possible to no longer also use the pressure dwell time during the passage of the main pressure rollers for the deaeration of the pressing material, but rather nearly exclusively for the final compaction. The pressure dwell time is thus essentially completely available for the action of the pressing force on the pressing material to produce and compact the pellet. In this way, it is possible to obtain hard tablets even in the case of ultrahigh rotor speeds and challenging pressing materials.

Alternatively to the use of initial pressure stations having an upper and a lower initial pressure roller, it is possible to use initial pressure stations which consists of an upper and a lower initial pressure rail. These initial pressure rails are located on the left before the upper and lower pressure roller. The terms “left” and “right” relate here to the spatial directions which result when the cam track is observed from the outside, thus as it appears to an external observer of a rotary press. In addition, the cam assignment is dependent on the rotational direction of the rotor of a rotary press. By way of example a rotary press will be described in this application, the rotor of which runs counterclockwise, i.e., around to the left.

In the upper cam track, the initial pressure rails are integrated on the left of the upper pressure roller into a pull-down cam, which then merges on the right of the pressure roller into the pull-up cam, which raises the upper punch above the filling device again. In the meaning of this invention, pull-down cams are those components of a cam track along which the upper punches move downward during the pressing procedure, while the pull-up cam controls the upward movement of the upper punches after the pressing procedure.

In rotary presses previously described in the prior art, the upper punch pull-down cam on the left of the upper pressure roller and the upper punch pull-up cam on the right of the upper pressure rover are individually fixedly fastened on the cam carrier of the upper cam track. From the highest point of the upper punch cam, the shafts of the upper punches are taken over by the pull-down cam and pulled downward, in the direction of the bottom dead center of the upper pressure roller. The cam itself has a stroke of approximately 25 mm up to the die upper edge. The active plunging of the upper punches into the die is performed by the set plunging depth of the upper pressure roller. Since the plunging depth of the upper punches can typically vary between 2 and 10 mm, the heads of the upper punches run at different heights against the upper pressure roller. With increasing plunging depth of the upper punches, this has the result that the starting angle becomes more unfavorable, whereby the wear on the tool and on the upper pressure roller, and also the noise level and the vibrations, increase in the rotary press.

Up to a plunging depth of the upper punches of 2 to 10 mm, an adjustment travel can be implemented using an upper punch pull-down and pull-up cam and in coordination with the adjustment capability of the upper pressure roller. One disadvantage of the rotary presses described in the prior art, however, is that no technically satisfactory solutions have been described for plunging depths of the upper punches greater than 10 mm. However, there are applications in which a plunging depth of the upper punches of up to 10 mm is not sufficient to produce various types of pellets. These applications relate in particular to the production of very tall single-layered pellets, and also the production of multilayered tablets.

In order to produce multi-layer tablets, firstly a first pressing material is filled into the holes of the die plate by means of a filling device within a filling station. For this purpose, the lower punches of the rotary press are pulled down to a defined filling depth by means of a stationary fastened filling cam. A space closed in three spatial directions for filling the pressing material is thus provided. The pressing surface of the lower punch forms the lower side of this closed space here. This is adjoined by the cylindrical die hole, which forms the outer wall of the pressing space. The pressing material can be filled through the open upper side of the pressing space by means of the filling device located above the die plate. The depth of the pressing space can be controlled by the use of different filling cams, which are interchangeable.

At the beginning of the filling procedure, the lower punches move flush with the die upper edge on the die pitch circle into the filling chamber of the filling device filled with pressing material and are continuously pulled downward by the filling cam until a predefined maximum filling position is reached. Since pressing material is located on the die plate during the entire downward movement of the lower punch, the pressing material is suctioned into the die hole during the downward movement of the lower punches, whereby a uniform, homogeneous filling of the die hole is achieved. In this case, a pressing space is advantageously formed by the walls of the die hole and the upper side of the lower punches. This pressing space is open on top, wherein the material to be compressed is filled via this opening as described.

The length of the filling cam corresponds to approximately half of the length of the filling opening of the filling device. Conventional rotary presses operate according to the principle of excess metering, i.e., more pressing material is filled in the die using the filling cam than is required for the finished tablets. A person of average skilled in the art refers to a gross filling. The filling procedure of the pressing material typically takes place at least up to the middle of the filling device. The metering unit now adjoins the filling cam for the lower punches. The lower punches can be raised manually or automatically in relation to the lowest filling position by 0 to 10 mm by the metering unit, whereby a net filling is achieved. At the same time, the excess pressing material is pushed back into the right side of the filling device and can be reused.

After ending of the first filling procedure, i.e., the filling of the first pressing material, the upper and lower punches are supplied to a pressing-on station. In the pressing-on station, the upper punches, which are controlled by the upper punch pull-down cam, plunge into the die hole and displace the pressing material of the first powder layer downward in the direction of the lower punch. The plunging depth of the upper punches is also influenced in this case by the setting of the position of the upper pressing-on roller. At the lowest point of the plunging of the upper punch, a free space is created above the first pressing material layer, which corresponds to the volume of the gross filling of the second or next layer, respectively. The corresponding cams and rails are also lowered until the lower pressing-on roller is reached. The upper and the lower pressing-on rollers are located in a very special position in relation to one another in the pressing-on station here. Due to the position of the upper pressing-on roller, the upper punches plunge into the die in such a way that after the upper punch pull-up in the die, a free space remains above the first layer, which corresponds to the gross volume of the second layer. The lower punches are positioned by the position of the lower pressing-on roller in such a way that, in conjunction with the plunging depth of the upper punches, the first layer of the pressing material is lightly pressed on.

After the pressing-on of the pressing material of the first layer, the upper punches are raised by the pull-up cam above the second filling device. In addition, the lower punches are conducted into the second filling and metering station by rails which are located at the height of the top dead center of the lower pressing-on roller. The second pressing material is filled into the die cavity by the second filling device. The second filling device does not interact with a filling cam, as the first filling station comprises. Rather, the gross filling depth for the second filling is created by means of the plunging depth of the upper punches in the pressing-on station.

After the filling of the second filling material by the second filling device, the excess pressing compound is pushed back in the metering station into the second filling device and the net filling of the second layer remains in the die of the two-layer tablet to be compressed. The pressed-on layer made of the first pressing material is located below the second layer.

Rotary presses which are known from the prior art have the disadvantage that very large filling depths are typically required for the filling of the die cavity created by the upper punches for the second pressing layer, because of which upper punches have to be provided which can implement large plunging depths. It has been shown that filling depths of 10 to 25 mm are required to obtain acceptable results for the production of multilayered tablets, in particular two-layer tablets.

In the rotary presses described in the prior art, plunging travels of up to 25 mm cannot be implemented using a single, fixed upper punch pull-down and pull-up cam. In general, three cam pairs are used, for example, for the following plunging depth ranges 0 to 10 mm
8 to 18 mm
15 to 25 mm.

If head-guided pressing tools are used in the rotary press, the individual cams are manufactured in their entirety from one piece. Thus, in the case of three different plunging depth ranges for one pressing station, three pull-down cams and three pull-up cams are required. However, if pressing tools are guided using an inner and an outer roller, it is then not possible to manufacture these guide cams from one piece. Rather, the cams consist of three parts: an inner cam, an upper cam, and an outer cam, which are fastened as a package together on the upper cam carrier. Therefore, a cam pair consists of, for example, three pull-down cam segments and three pull-up cam segments. In the case of three different plunging depth ranges, 18 cam segments are required per pressing station. This is linked to high investments for the user, since these cams are manufactured from hardened steel.

This disadvantage, linked to the use of a large number of costly cam segments, multiplies if not only two-layer tablets are produced, but rather multilayered tablets having up to five different pressing material layers. In addition to the high acquisition costs for the cam segments, significant storage requirements result for the cam segments, and also significant logistics and monitoring expenditure to prevent incorrect cam combinations from being installed in the rotary press during the reequipping of a rotary press. The correct equipping of a rotary press requires trained technical personnel, the use of which is also linked to high costs.

Proceeding from this prior art, it is the object of the present invention to provide a rotary press which does not have the disadvantages of the rotary presses described in the prior art and additionally avoids the use of a variety of costly cam segments, if it is required that upper punches plunge with plunging depths up to 25 mm into the die hole for the production of multilayered tablets.

DESCRIPTION OF THE INVENTION

The object is achieved according to the invention by a rotary press for the production of single-layered or multilayered tablets comprising at least one filling device for filling a pressing material into openings of a die plate, at least one filling station, at least one metering station for the lower punches, at least one pressing station, and at least one ejection station having tablet stripper and tablet discharge chute, wherein the at least one pressing station comprises respectively an upper and a lower pressing roller and respectively an upper and a lower cam track, wherein the cam tracks interact with upper and lower punches. The rotary press according to the invention is characterized in that, below the upper pressure roller, at least one upper vertically-adjustable combination cam, comprising a pull-down cam, an upper initial pressure rail, a safety rail, and a pull-up cam is provided arranged and the lower cam track comprises a vertically-adjustable lower initial pressure rail and a one-piece ejection cam, which are provided attached below the lower pressure roller. In the meaning of this invention, the catch cam is preferably also referred to as a safety rail. The terms initial pressure rail and initial pressure cam are preferably used synonymously in the meaning of the invention.

It is preferable to replace the use of an upper and a lower initial pressure roller by an upper and a lower initial pressure rail in the at least one initial pressure station. These initial pressure rails are located on the left before the upper and lower pressure roller. In the context of this application, the term "cam track" refers to a juxtaposition of various cam segments and rails, which together form an essentially closed circle. The cam track is used to guide the roller-guided or head-guided pressing tools. It is preferable for the cam segments to be fastened to the cam carriers using screws. In the meaning of this invention, cams generally have a nonlinear profile and are formed rigid. In contrast, rails have an essentially linear profile and represent movable components of the rotary press.

The term "pressure station" preferably comprises both main pressure stations and also initial pressure stations and pressing-on stations. Preferably, the pressing procedure of a pellet takes place in a main pressure station, wherein the pressing forces for producing the pellet are transmitted from the main pressure rollers by means of the pressing tools onto the powdered material to be compressed in conjunction with this main pressing procedure. It is furthermore preferable for deaeration of the pressing material to take place in an initial pressing station. Preferably the entire pressing time is then advantageously available for the compaction of the pressing material during the main pressing procedure. A pressing-on station is preferably used during the production of multilayered or jacket-core tablets, for example, to lightly press on a first powder material, which is preferably already located in the die opening and thus advantageously prepare for the accommodation, for example, of a pellet core or a further filling layer.

The terms right and left are used in the context of this application as they result for an external observer of an exemplary cam track, as shown in FIG. 1 of the present application. In FIG. 1, the position of an upper pressure roller is indicated in the middle, wherein the initial pressure rail according to the invention is located to the left thereof. For example, the pull-down cam is located on the left of the pressure roller within the cam track, which guides the illustrated roller-guided upper punch in the direction of the die plate.

FIG. 1 shows an upper cam track as is provided integrated into the rotary press according to the invention, for example. It is preferable for the pressure rollers to be provided arranged above the cam track. The upper pressure roller faces in the direction of an upper housing cover of the rotary press, while the cam track faces toward a carrier plate, on which the rotor stands. A movement in the direction of this carrier plate is referred to as a movement "downward" in terms of this invention, while a movement in the direction of the upper housing cover represents of movement "upward" in terms of this invention.

The upper and lower initial pressure rails advantageously have long straight regions for the shaft rollers or the shaft heads of the pressing tools, i.e., the upper and lower pressing punches. A pressure dwell time of the initial pressure force in the region of the rails which is substantially extended in comparison to the prior art results therefrom. Advantageously, larger initial pressure forces can be transferred without wear over a longer distance without friction in conjunction with the use of shaft rollers. In addition, the extended pressure dwell time of the initial pressure force results in improved material deaeration of the pressing material.

It represents a further advantage of the invention that the shafts of the pressing tools can optionally be equipped with an inner and an outer shaft roller. When using two shaft rollers, these act on an inner and an outer initial pressure rail, whereby advantageously an increased initial pressure force and a lengthened pressure holding time in comparison to the use of initial pressure rollers can be implemented.

It has furthermore proven to be very advantageous that the initial pressure rails according to the invention represent a space-saving alternative for transferring an initial pressure force in comparison to initial pressure rollers. It is preferable for an initial pressure station to occupy the same space on the pitch circle of the cam track as the main pressure station. This applies in particular if the main pressure rollers and the initial pressure rollers advantageously have equal roller diameters. It was completely surprising that the initial pressure rails according to the invention only require 20% of the space requirement of a pressure station, so that the remaining space can be used for longer and softer control cams for controlling the pressing tools and for longer filling devices. The use of longer and flatter control cams advantageously ensures quiet, low-wear operation of the rotary press. Long filling devices advantageously result in an improved filling result of the die holes by the pressing material, whereby an improved homogeneity and a uniform weight of the obtained pellets are achieved. A further surprising advantage is that a rotary press having upper and lower cams optimized in this manner can run substantially faster, which results in a higher productivity.

It is preferable that the upper initial pressure rail can be adjusted synchronously with the position of the pressure rollers. Advantageously, the distance of the initial pressure rail from the bottom dead center of the upper pressure roller can also be precisely set by this synchronous vertical adjustability. Uncontrolled plunging of the upper punches into the die holes is thus reliably prevented. It was completely surprising that this advantage according to the invention can be implemented independently of the set upper punch plunging depth. In conventional rotary presses described in the prior art, the upper punches can plunge uncontrolled up to a depth of several millimeters into the die holes, since a rigidly formed catch rail attached in the lower region of the upper cam carrier can only then catch the upper punches.

If, upon the use of the adjustable initial pressure rail according to the invention, the distance between the initial pressure rail and the pressure roller is, for example, 0.5 mm and if the pressure roller is set to an upper punch plunging depth of 3 mm, the upper punch, with absent pressing material, for example, can plunge at most 3.3 mm instead of the typical multiple millimeters, for example, in the range of 6 to 8 mm, into the die.

It is preferable for the vertical adjustment of the upper combination cam, comprising a pull-down cam and a pull-up cam, to be performed manually or automatically. Due to the flexible design of the vertical adjustment, the rotary press according to the invention is individually adaptable to the requirements of the user. It is furthermore preferable that the upper combination rail is provided fixedly connected to the upper cam carrier after an adjustment.

The ejection cam is preferably used for ejecting the produced pellets. It is preferable that after completion of the production of the tablets, the tool pairs leave the pressing station. Preferably, the upper punch is then firstly raised by the pull-up cam. During the upward movement of the upper punch, the lower punch preferably reaches the ejection rail, whereby the lower punch is advantageously raised time-delayed in parallel to the upper punch. It is preferable that the lower punch pushes the finished pressed tablets from the pressing positions in the die hole upward to the upper edge of the die or the die plate, respectively, due to its upward movement. In this case, the upper punch preferably has a minimum distance to the upper edge of the tablets at all times. A contact between the produced tablets and the upper punch is thus effectively avoided, which could result, for example, in damage or destruction of the tablets due to crushing.

In a further preferred embodiment, the invention relates to a rotary press, in which a closed continuously vertically-adjustable safety rail is provided arranged between the pull-down cam and the pull-up cam in the region of the upper pressure roller. A person of average skill in the art knows that in conventional rotary presses there is no cam-related connection between the pull-down cam and the pull-up cam, so that a gap exists in the upper cam track below the upper pressure roller due to this absent cam connection. In order that the upper punches do not fall uncontrolled onto the upper part of the rotor of the tablet press in the region between the pull-down cam and the pull-up cam, a rigid catch rail is located on the cam carrier in conventional rotary presses, which prevent this falling through of the upper punches. This rigid catch rail is typically arranged in the lower region of the cam carrier, so that the upper punches nonetheless plunge up to 10 mm into the die, or can fall therein, in the region below the upper pressure roller, in spite of the presence of the rigid catch rail.

The undesired plunging of the upper punch into the die is only harmless if either no lower punches are present in the rotor lower part or, if the lower punches are present in the die holes, the dies are filled with pressing material. In the first case, a collision of the upper and lower punches is avoided in that the lower punches are not present in the die holes. In the second case, the upper punches are placed on the material to be compressed, without touching the pressing surfaces of the lower punches. The existing pressing material thus protects the pressing surfaces of the upper and lower punches from damage.

However, damage to the upper and lower punches can occur if the lower punches are located inside the die holes and the rotary press is started by motor without pressing material being present in the die holes. If the upper punches plunge in free-fall at high speed up to 10 mm into the die holes, they strike with great force on the pressing surfaces of the lower punches, whereby the lower and upper punch pressing surfaces are damaged and become unusable due to engraving or fracture notches in the upper and/or lower punches. A reacquisition of pressing tools is linked to considerable financial expenditures and long delivery times. In addition, the damaged tools have to be identified and replaced, which results in shutdown times of the rotary press and increased personnel expenditure.

Comparable damage can also occur during the production if a material congestion occurs. The possibility then exists that the rotary press will run empty, i.e., without pressing material, whereby a collision of the upper and lower punches is enabled. To avoid collisions between the upper and lower punches, it is provided according to the invention that a closed safety rail, which can be continuously adjusted in height, is provided between the pull-down cam and the pull-up cam in the region below the bottom dead center of the upper pressure roller.

In order to be able to adjust the upper combination rail consisting of a pull-down cam, initial pressure rail, safety rail, and a pull-up cam, advantageously only two clamping screws have to be loosened. The cam can subsequently be moved upward or downward by turning an adjustment screw. This is preferably performed in dependence on the set position of the upper pressure roller. The combination cam comprises a key guide on its rear side, while the two clamping screws engage via an oblong hole in the combination cam in the threaded holes in the cam carrier. By way of this preferred arrangement, the combination cam is advantageously axially adjustable in the height, but is not radially movable.

Preferably, in the lower initial pressure rail, the fastening formed as clamping is embodied comparably. The adjustment of the lower initial pressure rail is advantageously easy to execute for the operator of the rotary press, since a special handwheel is provided for this purpose. It is preferable that during the adjustment of the lower initial pressure rail, the lower punches move from different vertical positions in relation to the initial pressure rail in dependence on the set metering position. This thus represents a technical challenge, which is overcome by the present invention in that the upper punches always strike from an identical position on the movable transition rails in relation to the combination cam. Advantageously, the lower shafts are fed to the initial pressure rail and relayed to the lower pressure roller, wherein they move from there to the next filling station or to the ejection station.

In a further preferred embodiment, the invention relates to a rotary press, in which the upper initial pressure rail is provided arranged set back 0.3 to 1.0 mm in relation to the upper pressure roller. It is preferable that the initial pressure rail is recessed behind the bottom dead center of the upper pressure roller.

The terms “set back” and “recessed” mean in terms of this invention that the initial pressure rail is provided offset upward with respect to the cam track. A person of average skill in the art knows that the wording “upward” in relation to the essentially circular cam track is to be understood to mean that set-back components of the cam track have a smaller distance to a following cam segment or the bottom dead center of the upper pressure roller. These definitions of the wordings apply equally to the upper and lower cam track.

It was completely surprising that rotary presses which operate particularly quietly and without machine vibrations can be provided with a distance of 0.3 to 1.0 mm between the upper pressure roller and the initial pressure rail. Advantageously, surprisingly quiet machine running results due to the distance according to the invention between the initial pressure rail and the pressure roller.

In a further preferred embodiment, the invention relates to rotary presses having movable transition rails, which are provided arranged on the right and left of the combination cam and each comprise a pivot joint in transfer regions to the combination cam. The movable transition rails are part of the upper cam carrier. The movable design of the transition rails advantageously enables a long adjustment travel of the upper punches of 0 to 25 mm. The pivot joints are thus each located between the movable transition rails and the upper combination cam, in other words, the upper combination cam is provided arranged between the two movable transition rails and is respectively connected thereto by means of the pivot joints at the outer sides of the combination cam.

A person of average skill in the art knows that a pivot joint enables a rotational movement of the elements connected to the pivot joint in one spatial plane. This spatial plane is perpendicular to an imaginary axis through the center point of the pivot joint, which is also referred to in the sense of this invention as a “rotational axis” or “axis of the rotational movement”. The rotational axis of the pivot joints according to the invention advantageously coincides with an imaginary connecting line between the center point of the circular cam track and the pivot joint.

In a further preferred embodiment of the invention, the movable transition rails each comprise a ball joint to compensate for angle and length changes in a transfer region to rigid transition rails. It is preferable that rigid transition rails adjoin the movable transition rails on the sides facing away from the upper combination cam. The rigid transition rails and the movable transition rails are each advantageously connected to a ball joint, which enables an angle and length compensation so that the movable transition rails do not jam in the event of an enlargement of the plunging depth of the upper punches.

Due to the use of the movable transition rails, which are connected by means of ball joints to rigid transition rails and by means of pivot joints to the upper combination cam, a rotary press can be provided in which plunging depths of the upper punches can be implemented in particular in a range between 10 to 25 mm. The rotary presses according to the invention are thus capable of compressing, for example, pressing materials at a high compaction ratio of 3:1 to 5:1, which are used, for example, in the production of multilayered tablets. Special pressing materials, for example, polywaxes, also require large filling depths and correspondingly large upper punch plunging depths linked thereto.

It was completely surprising that due to the movable design of the transition rails in conjunction with the use of ball joints and pivot joints in the transfer regions to the rigid transition rails and the upper combination cam, an upper cam track can be provided, so that an upper punch plunging range of 0 to 25 mm can be covered. The use of movable transition rails is particularly advantageous, because the use of different cam pairs is thus eliminated. Acquisition costs for additional rails and cams, and also expenditures for the storage of rails and in the field of logistics can thus be saved. In addition, the installation of different cams and rails is avoided, which reduces the personnel expenditure during the operation of the rotary press according to the invention. In particular, however, the monitoring expenditure is also eliminated, which is required to establish whether the correct cams are used in combination with the pressing material to be compressed.

The adjustable initial pressure rail preferably represents an integrated part of the pull-down and pull-up rail and is located below the upper pressure roller in the upper cam track. The fastening of the adjustable initial pressure rail on the upper cam carrier is preferably implemented by means of two screws, wherein the fastening is displaceably formed. The displacement is preferably possible in that the fastening holes of the fastening screws are embodied as oblong holes. It is preferable that the fastening screws are loosened to adjust the upper combination real. After the loosening of the fastening screws, an adjustment screw can be turned to the right or to the left, whereby a vertical adjustment of the combination rail upward or downward in accordance with the setting of the upper pressure roller is achieved. After completed adjustment of the combination real, the two fastening screws, using which the upper combination rail is fastened on the cam carrier, are tightened again. It is preferable for the upper combination rail to be provided fixedly connected to the upper cam carrier again after the vertical adjustment. The vertical adjustability of the initial pressure rail is advantageously ensured by the interaction of the fastening screws with the oblong holes.

It was completely surprising that due to the vertically-adjustable design of the combination rail, a rotary press can be provided which covers a complete adjustment range of the upper punches of 0 to 25 mm plunging depth. It is furthermore preferable that the upper combination rail has a long key on its rear side, which enables an axial movement in a corresponding groove in the cam carrier, but prevents a radial movement. The term “rear side” in terms of this invention refers to the side of the upper combination cam facing away from the external observer of the upper cam track, i.e., the rear side of the combination cam according to the invention faces toward the imaginary center point of the circular cam track.

In a further preferred embodiment, the invention relates to a rotary press in which the lower initial pressure rail is provided arranged on a swing arm. In terms of the present invention, a swing arm is a rotatable rail which has its rotation point on the left side for an external observer of the cam track. On the right side of the swing arm, it supports itself with its lower side on the load cell, which preferably measures and displays the initial pressure forces.

It is preferable that the lower initial pressure rail is fastened by means of fasteners on the preferably stably embodied swing arm. For example, it is possible to use fastening screws as fasteners. The swing arm is advantageously rotatably fastened on a plate by means of further fasteners, for example, bolts. This plate has on its rear side, i.e. on the side facing away from the external observer of the lower cam track, a long key, which engages in a corresponding groove in the lower cam carrier. An axial movement of the plate is advantageously enabled by this key guide; however, a radial movement of the plate is prevented by this type of fastening.

It represents a further advantage of the invention that the fastening according to the invention of the lower initial pressure rail by means of a swing arm on a plate ensures the parallel vertical adjustability of the plate and the lower initial pressure rail.

This type of vertical displacement for the lower initial pressure rail is particularly simple and less susceptible to error for the user of the rotary press according to the invention. This is advantageous above all because the lower initial pressure rail has to be adjusted more frequently in dependence on the desired thickness to be set of the pellet to be produced than, for example, the upper initial pressure rail.

In a further preferred embodiment, the invention relates to a rotary press, in which a movable lower transition rail is provided arranged in the lower cam track between a metering cam and the lower initial pressure cam, wherein the movable lower transition rail is connected on the right side by means of a pivot joint to the lower initial pressure rail and the movable transition rail is provided connected on the left side by means of a ball joint to the metering cam. The vertically-adjustable lower initial pressure rail changes its position in relation to the metering cam upon every performed vertical adjustment. Due to the arrangement according to the invention of the movable lower transition rail between the metering cam and the lower initial pressure cam, a smooth and continuous transfer of the lower shafts of the lower punches from the metering cam to the lower initial pressure cam is advantageously provided. Snagging of the lower shafts in the region of the movable transition rail is thus advantageously avoided.

It is preferable that the movable lower transition rail is pivotably and displaceably mounted, which is achieved by the connection of the movable lower transition rail by means of a pivot joint on the right side of the movable transition rail to the lower initial pressure rail. The movable transition rail is connected by means of a ball joint to the metering cam on the left side of the movable lower transition rail. The rotary joint advantageously represents a fixed pivot point of the movable transition rail, while the ball bearing on the left side enables a rotation and thrust movement of the movable transition rail.

It is furthermore preferable that a double-sided ejection rail, which is used for measuring the ejection force by means of a measuring cell, is provided on the right of the lower pressure roller of the initial pressure station and the adjustable lower initial pressure rail.

The ball bearing of the movable lower transition rail advantageously enables a compensation of height and length changes, which occur upon a vertical adjustment of the lower initial pressure rail.

In a further preferred embodiment, the invention relates to a rotary press in which the lower initial pressure rail is vertically adjustable automatically or manually via a handwheel. It is preferable that the setting of the relative position of the lower initial pressure rail in relation to the lower pressure roller is measured using a spindle and displayed using a gauge. Advantageously, the plate connected to the lower initial pressure rail, after completed adjustment of the lower initial pressure rail, can be clamped on the lower cam carrier by means of fasteners, for example, a screw. The adjustability of the lower initial pressure rail enables an optimum adaptation of the rotary press according to the invention to different operating requirements, which are determined by different pellet geometries, for example, the desired thickness of a pellet.

In a further preferred embodiment, the invention relates to a rotary press in which the lower initial pressure rail is provided arranged set back by 0.3 to 1.0 mm in relation to the lower pressure roller. Due to the set-back arrangement of the lower initial pressure rail in relation to the top dead center of the lower pressure roller by 0.3 to 1.0 mm, the initial pressure force applied within the initial pressure station is advantageously less than the main pressure force applied within the main pressure station. This is necessary since the upper and lower initial pressure rails and the mounts thereof are not designed for absorbing high pressing forces as occur within a main pressure station. A faulty arrangement of the upper or lower pilot pressure rails in relation to the upper or lower pressure rollers results in immediate stopping of the drive of the rotary press according to the invention.

In a further preferred embodiment, the invention relates to a rotary press, in which the lower initial pressure rail is provided attached fastened and/or clamped to the lower cam track by means of fasteners manually and/or automatically. The fasteners can preferably be fastening screws, using which the lower initial pressure rail is fastened on the swing arm. The fastening of the lower initial pressure rail advantageously enables the vertical adjustability of the initial pressure rail in relation to the lower pressure roller, whereby simple operability of the rotary press according to the invention is ensured.

In a further aspect, the invention relates to the use of the rotary press according to the invention, wherein a distance of the upper initial pressure rail to the upper pressure roller is measured and displayed by a gauge. The gauge for measuring and displaying the distance between the upper initial pressure rail and the upper pressure roller is preferably arranged above the upper initial pressure rail by means of a mount and is connected by means of fasteners, for example, a screw, to the upper initial pressure unit. Advantageously, the gauge ascertains at all operating times the actual distance of the upper initial pressure rail to the upper pressure roller and displays it. An acquisition of the actual operating parameters of the rotary press according to the invention is thus advantageously enabled.

It was completely surprising that the measurement and display of the actual distance of the upper initial pressure rail to the upper pressure roller required due to the movable design of the initial pressure rail can be implemented by means of a device which is kept technically simple, for example, a mechanical round display instrument.

In a further embodiment, the invention relates to the use of a rotary press, in which a measurement and a display of the distance between the upper initial pressure rail and the upper pressure roller is performed mechanically and/or electronically, wherein the measurement result is displayed in a touch panel. A person of average skill in the art knows that a touch panel is a touchscreen or a touch display screen, wherein the terms are used synonymously in the scope of the present application. A touch panel is a combined Input and output device, in which by touching parts of an image on a display screen as part of the touch panel, the program sequence of the rotary press can be directly controlled. It is preferable that the touch panel is a device which reacts in particular to resistive and capacitive inputs.

This alternative embodiment of the invention corresponds to the modern requirements for simple operability of a rotary press, wherein the results of a distance measurement, which can be performed manually or electronically, are advantageously displayed in a touch panel. The display of the measurement results in a touch panel is particularly advantageous, since the user of the rotary press can react to the displayed results without time loss and can input them directly via the touch panel.

In a further preferred embodiment, the invention relates to the use of a rotary press in which a null position between the upper initial pressure rail and the upper pressure roller and a null position between the lower initial pressure rail and the lower pressure roller is mechanically and/or electronically monitored. Null position refers in the context of this application to the setting in which the lower initial pressure rail and the top dead center of the lower pressure roller are located at one height. Similarly thereto, the null position for the upper cam track is defined by the height inequality of the upper initial pressure rail with the bottom dead center of the upper pressure roller. It is necessary for the initial pressure rails to always be set back in relation to the dead centers of the pressure rollers, preferably by an amount of 0.3 to 1 mm, so that the initial pressing force is always less than the main pressing force, Otherwise, damage would occur on the initial pressure rails and the mounts thereof, since they are not designed for the high pressing forces which occur at the main pressure in the main pressing station.

In a further preferred embodiment, the invention relates to a use of the rotary press, in which the rotary press is stopped automatically if the upper initial pressure rail is provided arranged below the upper pressure roller and/or the lower initial pressure rail is provided arranged above the lower pressure roller. It is preferable that this stop mechanism is implemented by limit switches, which are provided at the upper and lower adjustment of the initial pressure rails. It is preferable that these limit switches stop the rotary press upon reaching a null position.

In a further preferred embodiment, the invention relates to the use of a rotary press, in which an initial pressing force is also measured at the upper initial pressure rail by means of a measuring cell and the measured initial pressing force is displayed in the touch panel. It is preferable that the initial pressure force arising during the pressing procedure between the upper and the lower initial pressure rails is measured using a measuring cell and displayed in a touch panel. The measuring cell is preferably fastened on the plate of the lower initial pressure unit, which is provided connected to a swing arm and the lower initial pressure rail. It is preferable that the measurement cell extends through the swing arm. The lower initial pressure rail is attached using fasteners, for example, two fastening screws, to the swing arm in the region of the measuring cell. It is preferable that the lower side of the lower initial pressure rail has mechanical contact with the upper side of the measuring cell.

If, for example, loads of the lower initial pressure rail now occur due to the rollers of the shafts of the lower punches, these loads are thus transmitted as a force to the swing arm, wherein the swing arm can yield downward slightly on the right side at a fixed pivot point to this force transmission due to its rotatable mounting. If the swing arm moves downward, the lower side of the initial pressure rail presses on the end face of the measuring cell and causes a force signal, which is advantageously displayed in the touch panel. It was completely surprising that a measuring cell for acquiring the initial pressure force can preferably be implemented in the lower initial pressure rail. It is furthermore preferable that the clamping of the lower initial pressure rail is performed manually or automatically.

It is preferable in terms of the invention that the rotary press comprises a measuring cell, using which preferably the initial pressure forces occurring during the pressing procedure between the upper and lower initial pressure rail can be measured and displayed in the touch panel. It is preferable that the measuring cell is provided arranged and/or fastened on the plate and protrudes through the swing arm. The lower initial pressure rail is preferably fastened, in particular fixedly screwed, on the swing arm in the region of the measuring cell, preferably using two screws, wherein a lower side of the lower initial pressure rail has mechanical contact with the measuring cell. In the event of a load of the lower initial pressure rail by the preferably two rollers of the lower punch shaft, the force is preferably transmitted to the swing arm, wherein the swing arm can preferably yield downward slightly under load via the pivot point. The downward movement of the swing arm preferably presses the lower initial pressure rail onto an end face of the measuring cell, whereby a force signal is advantageously generated, which can be displayed, for example, on the touch panel.

It is furthermore preferable in terms of the invention that the rotary press is configured to ensure position monitoring of the lower initial pressure rail. For this purpose, the rotary press preferably comprises a rising lower initial pressure rail, which is preferably provided arranged precisely below the upper initial pressure rail and preferably acts on the rollers of the lower pressing punch shafts. Due to this advantageous arrangement of the rising lower initial pressure rail, a desired initial pressure force is exerted on the pressing material, which is preferably located in the holes of the die between the surfaces of the upper and lower punches. Monitoring of the (null) position of the lower initial pressure rail can preferably be performed by a rocker arm and a limit switch. Fastening of the plate on the lower cam carrier can be achieved, for example, using a fastener, such as a screw.

The invention is described in greater detail on the basis of exemplary embodiments and the following figures; in the figures.

Figure 1:
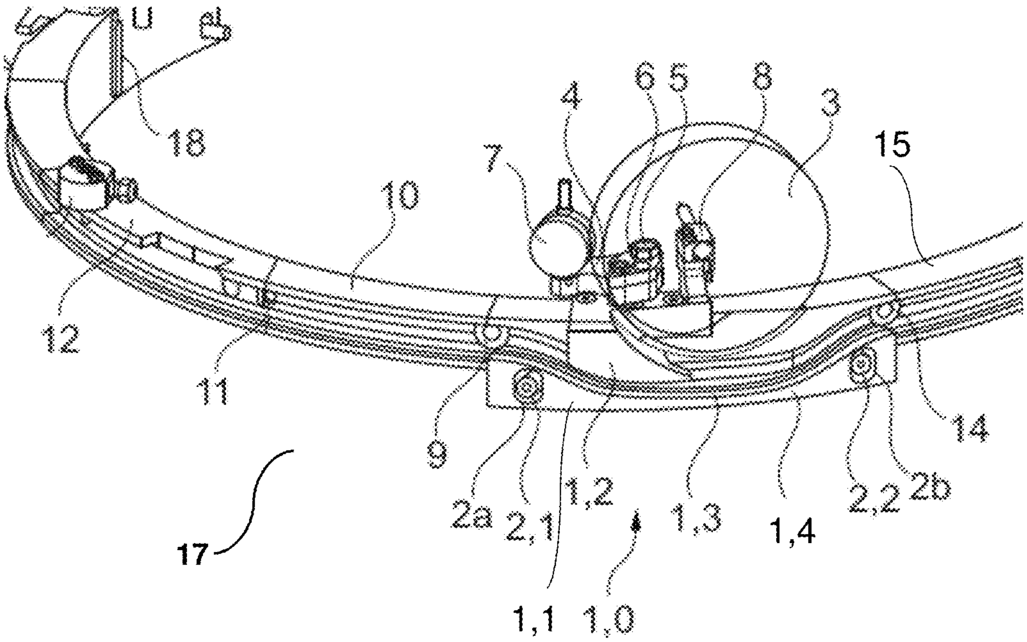
FIG. 1 shows a preferred embodiment of an upper cam track of a rotary press
Figure 3:
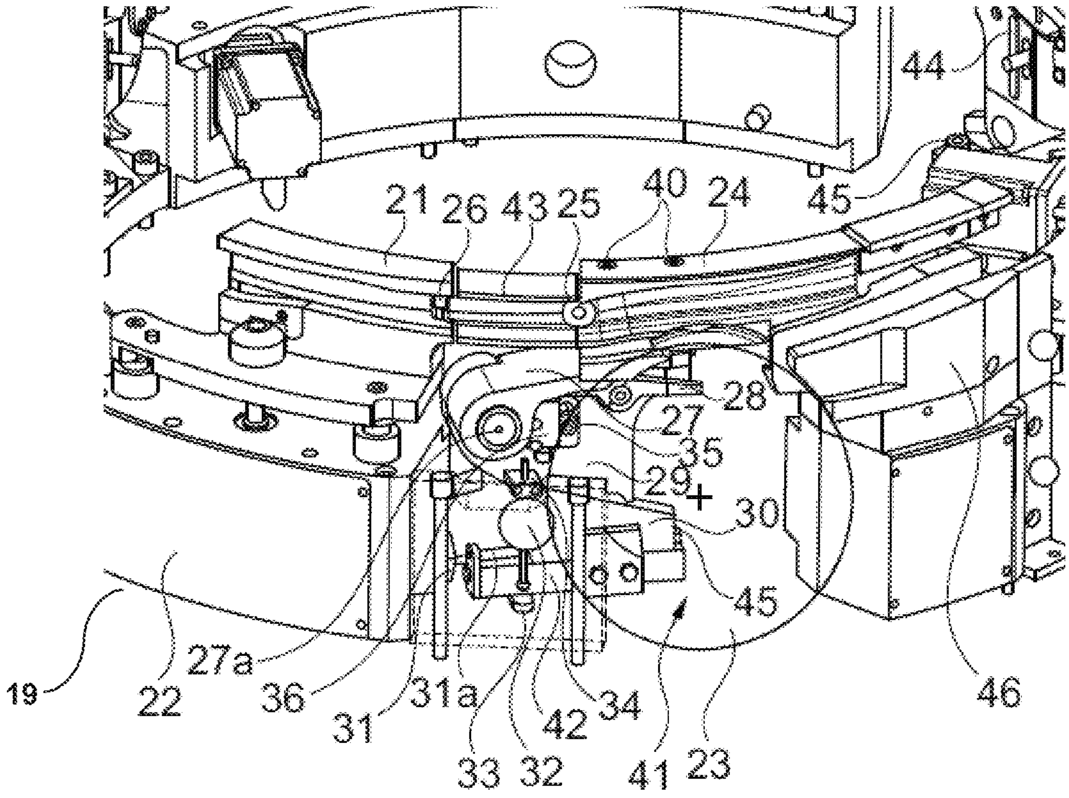

FIG. 3 shows a preferred embodiment of a lower cam carrier having cam track of a rotary press FIG. 1 shows a preferred embodiment of an upper cam track (17) of a rotary press. An upper pressure roller (3) is schematically indicated in FIG. 1. This interacts with the press punches and produce the tablets in the die holes of the die. In particular the upper initial pressure unit (1) is shown in FIG. 1, which preferably consists of the inner initial pressure rail (1.1), the outer initial pressure rail (1.2), and the safety rail (1.3), wherein the upper initial pressure unit (1) is synonymously referred to as a combination cam in terms of the invention. The inner initial pressure rail (1.1) and the outer initial pressure rail (1.2) are preferably embodied to be adjustable. It is preferable in terms of the invention that for this purpose firstly the fastening screws (2.1 and 2.2) are loosened. The position and/or height of the upper initial pressure rail (1) can be set in accordance with the setting and/or position of the upper pressure rollers (3) by an adjustment of the adjustment screw (6), wherein advantageously monitoring of the zero position of the upper pressure roller (3) in relation to the initial pressure rail (1) is performed by a sensor (8). It is furthermore preferable that the actual distance between upper pressure roller (3) and initial pressure rail (1) is performed by means of a gauge (7), in particular a dial gauge, which is also shown in FIG. 1. Furthermore, a mount (4) is shown for the dial gauge, and also a fastening screw (5) for this mount. After completed adjustment of the initial pressure rail (1) in relation to the pressure roller (3), the two screws (2.1 and 2.2) can be tightened again.

Is furthermore preferable that the cam carrier (17) comprises keys (18) on its inner side, which advantageously enable an axial movement of the initial pressure rails (1.1 and 1.2) in a groove in the cam carrier (17) and advantageously prevent a radial movement of the initial pressure rails (1.1 and 1.2).

It is preferable in terms of the invention that the safety rail (1.3) is provided arranged between the initial pressure rails (1.1 and 1.2), it is preferably also referred to as a catch rail or integrated safety rail in terms of the invention. It is advantageously arranged below the bottom dead center of one of the upper pressure rollers (3) and thus advantageously replaces a gap in the cam path, which exists in conventional tablet presses between the pull-down cam and the pull-up cam (1.4). The gap enables the upper punches to be able to plunge over a greater region of the cam path into the die to transmit the pressing pressure onto the tablet material to be compressed. In conventional presses, in order to prevent the upper punch from plunging excessively deeply into the die in the region below the upper pressure roller (3), a so-called catch cam is typically provided, which is supposed to prevent a placement of the punch heads on the rotor upper part or falling of the pressing punch out of the cam path. However, it has been shown in practice that problems can arise in this design if no pressing material is located in the die and the upper punch was pressed unbraked onto the uncovered lower punch.

The risk of such mechanical damage to the pressing punches is prevented by the provision of the integrated safety rail (1.3). Since the adjustable initial pressure rail (1.1 and 1.2) is preferably located 0.3 to 1.0 mm behind the pressure roller (3), the upper punch can also only plunge by this amount beyond the pressure roller (3) into the die, whereby touching of the pressing punch surfaces is completely precluded. Advantageously, the outer initial pressure rail (1.2) can also function as a pull-down cam in terms of the invention and is also synonymously referred to as such.

It is preferable that the inner initial pressure rail (1.1) is provided arranged below an upper pressure roller (3) and can be fastened using two screws (2.1 and 2.2), which are preferably embodied as clamping screws, on the cam carrier (17). It is preferable in terms of the invention that the fastening holes for the screws (2.1 and 2.2) are embodied as oblong holes (2*a* and 2*b*), so that advantageously a displaceability of the inner initial pressure rail (1.1) is enabled.

A transition cam (not shown) can be used to accommodate the upper shafts of the pressing punches, while dies of the die plate are filled by a filling device. The transition cam can preferably be provided arranged between the movable rails (10 and 15), so that the transition cams are preferably each provided arranged between one of the preferably three pressure rollers (3) within the upper cam track (17). The transition rail can comprise a sensor (not shown), which is configured to monitor the sluggishness of the upper punches and the upper punch removal opening. It is preferable that if the rotor rotates counterclockwise, the upper shafts of the pressing punches are fed via preferably movable rails (10) to the upper initial pressure rail (1). At the end of the rails (10), the inner shaft rollers can be transferred after the joint (9), which is preferably formed as a pivot joint, to the pull-down cam of the initial pressure rail (1), where they are preferably pulled downward. A transfer of the shafts to the inner initial pressure rail (1.1) and the outer initial pressure rail (1.2) preferably takes place here, whereupon the shafts are lowered further until a straight region of the initial pressure rails (1.1 and 1.2) is reached.

It is preferable that the upper initial pressure unit (1) and the initial pressure rails (1.1 and 1.2) are embodied to be vertically adjustable in relation to the pressure rollers (3). This vertical adjustment can advantageously take place manually or automatically. It represents a particular advantage of the invention that an optimum position of the initial pressure rail (1, 1.1, 1.2) in relation to the bottom dead center of the pressure roller (3) can thus be set independently of the setting and/or position of the upper pressure rollers (3).

FIG. 1 furthermore shows the preferably movable, i.e., embodied as adjustable, transition rails (10 and 15), and also the preferably rigid transition rails (12), wherein the rigid transition rails (12) are preferably provided arranged so that they advantageously enable a transition of the upper shafts of the pressing punches over the filling devices of the tablet press. It is preferable in terms of the invention to refer to the transition rail (10) synonymously as an inlet rail and the transition rail (15) as an outlet rail. FIG. 1 shows that the movable transition rails (10 and 15) for guiding the upper shafts between filling device and upper pressure roller (3) are preferably provided arranged between the preferably rigid transition rails (12) and the initial pressure unit (1).

In this case, the preferred movable design of the transition rails (10 and 15) represents a significant advantage in relation to conventional tablet presses, since due to the mobility of the transition rails (10 and 15), a transition of the upper shafts from the preferably rigidly formed transition rails (12), which are fixedly fastened on the cam carrier, to the vertically-adjustable initial pressure rails (1.1 and 1.2) is enabled. It is particularly preferable in terms of the invention if the preferably movably designed transition rails (10 and 15) compensate and/or overcome the height differences resulting due to the vertical adjustability between the preferably rigidly formed transition rails (12) and the vertically-adjustable initial pressure rails (1.1 and 1.2). This is advantageously ensured by the provision of joints (9 and 14), which according to FIG. 1 are provided arranged at the transfer point between the inlet rail (10) and the initial pressure rail (1) or at the transfer point between the initial pressure rail (1) and the outlet rail (15), respectively, and are preferably designed as pivot joints. Due to the preferably movable design of the transition rails (10, 15), a length compensation is required, which is preferably performed in relation to the preferably rigid transition rails (12) by means of further joints (11), wherein these joints are preferably referred to as compensation joints and are formed as ball joints. Jamming of the inlet rail (10) and the outlet rail (15) is particularly effectively avoided by the provision of the joints (9, 11, 14), whereby a smooth sequence of the tablet production process is promoted.

A further advantage of the invention is that the shafts can be axially guided by means of rollers, wherein due to the in particular one-sided vertical adjustability of the transition rails (10 and 15), jamming of the inner guide rollers of the shafts within the cam carrier (17) and/or its components is surprisingly effectively prevented. This is advantageously to be attributed to the fact that in contrast to conventional head-guided pressing punch shafts, a large amount of head freedom for the movement of the shafts does not have to be provided, whereby in particular the risk of severe mechanical damage due to jamming of the shafts can be substantially reduced. The advantages mentioned here for the preferably movable transition rails (10 and 15) each also apply to the transition rails (10 and 15) preferably attached between other pressure rollers (3) in the cam track.

FIG. 1 shows a detail of an upper cam carrier (17), which can comprise three pressure rollers (3), for example. However, the invention is not restricted to such cam carriers, but rather can be used in particular in single, double, and triple presses, wherein the number of the pressure rollers (3) can vary.

Figure 2:
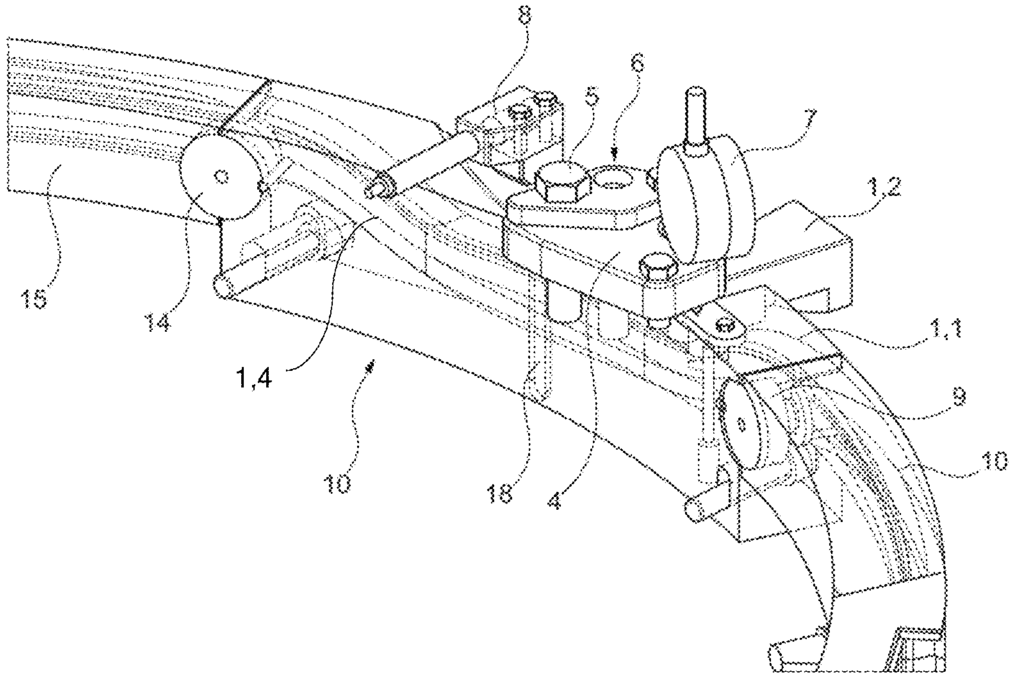
FIG. 2 shows a detail of a preferred embodiment of an upper cam track of a rotary press (rear view)

FIG. 2 shows a detail of one preferred embodiment of an upper cam track (17) of a rotary press. In particular, a detailed view of a rear view of a preferred cam track (17) is illustrated in FIG. 2, i.e., a view as can be displayed out of the inner region of the tablet press, for example.

FIG. 3 shows a detail of a preferred embodiment of a lower cam carrier (17) having cam track of a rotary press. In particular, the location of the lower pressure roller (23) within the cam track of the cam carrier (19) is schematically shown. The preferred embodiment of the lower cam track (19) shown in FIG. 3 advantageously enables the measurement of the initial pressure force and thus substantially contributes to the quality management within the tablet production process. The lower initial pressure station preferably comprises a lower initial pressure rail (24), which is preferably provided fastened using two screws on a preferably stable swing arm (27), wherein the swing arm (27) is preferably rotatably designed and can be fastened by means of a bolt (27*a*) on a plate (29).

The plate (29) preferably comprises a key (44), which preferably engages in a corresponding groove in the cam carrier (19), wherein advantageously an axial key guide of the plate (29) is enabled, but a radial movement is effectively prevented. It is preferable in terms of the invention that the plate (29) is supported on a wedge (30), which can move axially in two guide rails (42). A star grip (31) and a spindle (31*a*) advantageously enable adjustability of the wedge to the right or left. Is preferable in terms of the invention that the wedge (30) is moved to the right when the star grip (31) is rotated to the right, wherein the spindle (31*a*), which is preferably formed by an adjustment spindle, follows this right movement In particular, this adjustment movement preferably results in a preferably parallel raising of the plate (29) and the lower initial pressure rail (24). Similarly, a left rotation of the star grip and the adjustment spindle preferably results in a preferably parallel lowering of the plate (29) and the lower initial pressure rail (24). This particularly convenient design of the adjustability of the lower initial pressure rail (24) is particularly advantageous because the lower initial pressure rail (24) has to be adjusted relatively frequently in practice, since the desired tablet thickness, for example, can be set using the height and/or position setting of the lower initial pressure rail (24). After completion of the adjustment of the lower initial pressure rail (24), the plate (29) can be fastened using a screw (35), for example, by clamping on the cam carrier (19).

Is preferable in terms of the invention that a null position of the lower initial pressure rail (24) can be monitored using a rocker arm (28) and a limit switch (36), wherein the null point is defined in particular as when the lower initial pressure rail (24) and the top dead center of the lower pressure roller (23) are located at one height with one another. It is particularly preferable in terms of the invention that the lower initial pressure rail (24) is provided arranged, for example, by 0.3 to 1.0 mm behind the top dead center of the lower pressure roller (23), so that the initial pressure is advantageously less than the main pressure. Advantageously, the upper null point sensor (8) and the null point limit switch (36) form a safety device within the tablet press, using which the tablet press can preferably be stopped instantaneously in the event of an incorrect setting of the upper (1) or lower (24) initial pressure rail.

A further advantage of the preferred embodiment of the lower cam track (19) shown in FIG. 3 is that the height and/or position setting of the lower initial pressure rail (24) can be measured using a spindle (34) and displayed using a gauge (32), preferably a dial gauge.

The vertical adjustability of the lower initial pressure rail (24) has the result that the position of the lower initial pressure rail (24) changes in relation to the metering cam (21). To ensure a smooth and problem-free transfer of the lower punch shaft between the individual components of the lower cam track (19), the lower transition rails (43) are also movably designed, in particular pivotably and displaceably mounted. The above-mentioned advantages apply similarly with respect to the preferably movably designed transition rails (10 and 15). It is preferable in terms of the invention that the transition rail (43) comprises a joint (25), which is advantageously designed as a pivot joint, in the transition region to the lower initial pressure rail (24).

At the other end, the transition rail (43) preferably comprises a joint (26), which is preferably designed as a ball (bearing) joint and advantageously enables a rotating and/or sliding movement.

LIST OF REFERENCE SIGNS

1 upper initial pressure unit
1.1 inner adjustable initial pressure rail
1.2 outer adjustable initial pressure rail
1.3 safety rail (catch rail)
2.1 clamping screw
2.2 clamping screw
2*a* oblong hole
2*b* oblong hole
3 upper pressure roller
4 mount for dial gauge
5 fastening screw for 4
6 adjustment screw
7 dial gauge

8 upper null point sensor
9 pivot joint
10 movable transition rail, inlet rail
11 ball joint
12 transition rail
14 pivot joint
15 movable transition rail, outlet rail
17 upper cam track
18 key
19 lower cam carrier with cam track
21 metering cam
22 adjustment of metering cam
23 lower pressure roller
24 lower initial pressure rail
25 pivot joint
26 ball joint
27 swing arm for lower initial pressure rail
27*a* bolt
28 null point rocker arm
29 plate
30 wedge
31 star grip
31*a* spindle
32 dial gauge
33 threaded spindle bearing
34 screw
35 clamping screw
36 null point limit switch
42 guide rail
43 movable transition rail
44 key
45 roller pins
46 ejection cam

The invention claimed is:

1. A rotary press for the production of single-layered or multilayered tablets, the rotary press comprising:
- at least one filling device for filling a pressing material into openings of a die plate;
- at least one filling station;
- at least one metering station for lower punches;
- at least one pressing station; and
- at least one ejection station having a tablet stripper and a tablet discharge chute,
- wherein the at least one pressing station includes respectively an upper pressure roller and a lower pressure roller and respectively an upper cam track and a lower cam track, wherein the upper and lower cam tracks interact with upper punches and the lower punches,
- wherein at least one vertically-adjustable upper combination cam, includes a pull-down cam, an upper initial pressure rail, a safety rail, and a pull-up cam arranged below the upper pressure roller, and the lower cam track includes a vertically-adjustable lower initial pressure rail and an integral ejection cam, wherein the vertically-adjustable lower initial pressure rail is located above the lower pressure roller and the integral ejection cam is located on a side of the lower pressure roller attached below the lower pressure roller.

2. The rotary press as claimed in claim 1, wherein a continuous vertical adjustment of the upper initial pressure rail takes place synchronously with a vertical adjustment of the upper pressure roller.

3. The rotary press as claimed in claim 1, wherein the upper initial pressure rail is arranged set back 0.3-1.0 mm in relation to the upper pressure roller and the lower initial pressure rail—is arranged set back 0.3-1.0 mm in relation to the lower pressure roller.

4. The rotary press as claimed in claim 1, wherein the at least one upper combination cam is attached with pivot joints on movable upper transition rails.

5. The rotary press as claimed in claim 4, wherein the movable transition rails are connected to a rigid transition rail with ball joints for compensating for angle and length changes.

6. The rotary press as claimed in claim 1, wherein the lower initial pressure rail is arranged on a swing arm.

7. The rotary press as claimed in claim 1, wherein a movable lower transition rail is arranged in the lower cam track between a metering cam and the lower initial pressure rail, wherein the movable transition rail includes a pivot joint in a transfer region to the initial pressure rail, and on the opposing side the movable transition rail includes a ball joint to compensate for height and length changes.

8. The rotary press as claimed in claim 1, wherein the lower initial pressure rail is adjustable in height manually via a handwheel and/or automatically.

9. The rotary press as claimed in claim 1, wherein the lower initial pressure rail is attachable manually and/or automatically to the lower cam track with fasteners.

10. A use of a rotary press as claimed in claim 1, wherein a vertical adjustment of the upper combination cam is performed.

11. The use of the rotary press as claimed in claim 10, wherein a measurement of a distance between the upper initial pressure rail and the upper pressure roller is performed mechanically and/or electronically, wherein a result of the distance measurement is displayed in a touch panel.

12. The use of the rotary press as claimed in claim 10, wherein a null position between the upper initial pressure rail and the upper pressure roller and between the lower initial pressure rail and the lower pressure roller is monitored mechanically and/or electrically.

13. The use of the rotary press as claimed in claim 10, wherein the rotary press is automatically stopped when the upper initial pressure rail is arranged above the upper pressure roller and/or the lower initial pressure rail is arranged above the lower pressure roller.

14. The use of the rotary press as claimed in claim 10, wherein an initial pressing force on the upper initial pressure rail is measured and the initial pressing force is displayed in a touch panel.

15. The use of the rotary press as claimed in claim 1, wherein the initial pressing force is measured with a measurement cell by loading the measurement cell by the lower initial pressure rail.

16. A use of a rotary press as claimed in claim 1, wherein the vertical adjustment of the upper combination cam is performed manually.

17. A use of a rotary press as claimed in claim 1, wherein the vertical adjustment of the upper combination cam is performed automatically.

* * * * *